United States Patent Office 2,970,769
Patented Feb. 7, 1961

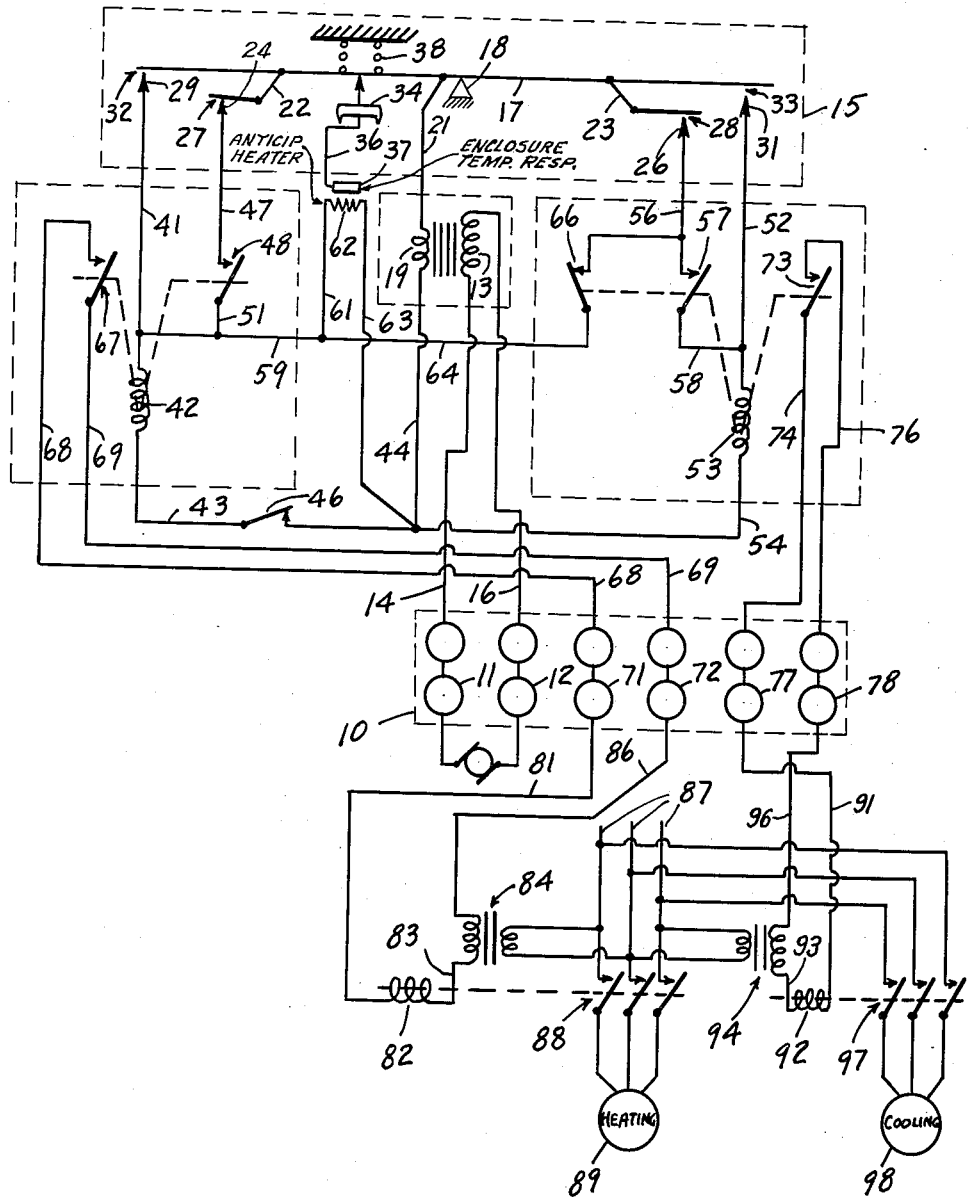

2,970,769

CONTROL CIRCUIT FOR HEATING AND COOLING APPARATUS

Ralph S. Penn, Goshen, and Henry O. Denman, Jr., Elkhart, Ind., assignors to Penn Controls, Inc., Goshen, Ind., a corporation of Indiana Filed July 6, 1959, Ser. No. 825,001

2 Claims. (Cl. 236—1)

This invention relates generally to control circuits for heating and cooling apparatus and particularly to a control circuit having a single anticipating heater for providing both heating and cooling anticipation.

Providing heat anticipation, or false heat for temperature control devices to lower the apparent differential of operation of the control devices is well known in the art. A thermostat incorporating the heat anticipation feature for controlling the operation of an enclosure heating means is disclosed in Shafer Patent 1,583,496, among others. A somewhat similar arrangement, but incorporating heat anticipation in a thermostat controlling a cooling means, is disclosed in Buchanan Patent 2,163,744.

The circuit of the present invention is adapted to jointly control a heating and cooling means with the narrow differential made possible by using the anticipating effect referred to above, the anticipating effect being obtained through the use of a single electric heating element which modifies the response of the temperature sensing element when operation of either the heating or the cooling means is required. Control circuits of the type herein disclosed may be used, for example, to maintain within a relatively narrow range the temperature within a specialized type of railway car adapted to transport perishable food items or the like. Such cars in transit are subject to widely varying ambient temperatures. Customarily they are provided with heating means, which might take the form of electrical resistance heaters, and with cooling means which might take the form of a conventional mechanical refrigeration apparatus. Control circuits of the type herein disclosed are utilized to operate either the heating or the cooling means depending on temperature conditions within the car.

It is an object of the present invention, therefore, to provide a control circuit for heating and cooling apparatus utilizing a single anticipating or false heat element for control of both the heating and cooling means for an enclosure such as a railway car.

The full nature of the invention will be understood from the accompanying drawing and following description and claims:

The figure is a schematic diagram of a control circuit embodying the present invention.

The circuit of the preferred form of the invention is diagrammatically shown in a single figure and includes a set of terminals which may be arranged on a terminal board indicated by broken lines at 10. The terminals 11 and 12 may be connected to a suitable source of electrical power, as indicated, and a transformer primary coil 13 is connected across the power terminals by wires 14 and 16.

A multi-contact switching mechanism is schematically shown enclosed by broken lines 15 to diagrammatically indicate a housing. The switching mechanism includes an electrically conductive switch lever 17 centrally supported at pivot 18 and electrically connected to one side of transformer secondary coil 19 by a wire 21. At each of its free ends the lever is provided with arms 22 and 23 offset from the lever. Fixed contacts 24 and 26 cooperate with the ends of arms 22 and 23, respectively, to provide two sets of contacts indicated generally at 27 and 28. The free ends of the lever 17 cooperate with fixed contacts 29 and 31 to provide two further sets of contacts indicated generally at 32 and 33. Acting upon the lever 17 is a power element or actuator 34, which may be of the conventional fluid-filled, diaphragm type, having a capillary tube 36 connecting it to a remote, temperature sensing bulb 37. The bulb is physically located in the enclosure, such as a railway car, whose temperature is to be controlled and responds to an increase and decrease of such temperature by causing the lever 17 to move clockwise (as viewed in the drawing) about its pivot 18 on temperature rise, the compression spring 38 opposing such clockwise movement serving to return the lever in a counterclockwise direction as the temperature sensed by bulb 37 falls.

The arms 22 and 23 are dimensioned so that as the lever 17 moves counterclockwise the contacts 27 close first and subsequently contacts 32 are closed, the arm deforming slightly to permit such closure. Similarly, on clockwise movement of the lever the contacts 28 initially close and subsequently contacts 33 close. It will be understood that the precise construction of the switch mechanism forms no part of the present invention and is herein disclosed only in a form illustrating its function and contact-operating sequence.

A wire 41 connects the contacts 32 to one side of an electromagnetic operator or relay coil 42, the other side of coil 42 being connected to the transformer secondary 19 by means of wires 43 and 44. A normally closed switch 46 is interposed in wire 43 and is operated by an actuator (not shown) responsive to abnormally high enclosure temperature to provide a conventional high temperature limit control. A wire 47 joins the contacts 27 with one side of a normally open holding switch 48 which is moved to closed position by energization of relay coil 42. The other side of switch 48 is connected by a wire 51 to the wire 41.

In similar fashion, a wire 52 connects the contacts 33 to one side of an electromagnetic operator or relay coil 53, the other side of the coil 53 being connected to the transformer secondary 19 by means of wires 54 and 44. A wire 56 joins the contacts 28 with one side of a normally open holding switch 57 which is moved to closed position by energization of relay coil 53. The other side of switch 57 is connected by a wire 58 to the wire 52.

A wire 59 connects wire 51 to a wire 61 which, at one end, is connected to one side of an electric heater 62. The heater 62 is physically located in heat exchange relation to the bulb 37 and, when energized, supplies anticipating heat thereto to distort the response of the bulb. The other side of the heater is connected by means of a wire 63 to the junction of wires 43 and 44. The terminus of wire 51 opposite the heater 62 is connected by means of a wire 64 to one side of a normally closed anticipating heater control switch 66. The switch 66 is moved to open position by energization of relay coil 53.

A normally open switch 67 is connected by means of wires 68 and 69 to terminals 71 and 72, switch 67 being moved to closed position upon energization of relay coil 42. Similarly, a normally open switch 73 is connected by means of wires 74 and 76 to terminals 77 and 78, switch 73 being moved to closed position upon energization of relay coil 42.

Connected to the terminal 71 is a wire 81 which is connected to one side of an electromagnetic operator 82. The other side of the operator 82 is connected by means of a wire 83 to one side of the secondary coil of a transformer 84. The other side of the transformer secondary coil is connected by means of a wire 86 to the terminal 72. The primary coil for the transformer 84 is connected across two of the three-wire power supply indicated at 87. The operator 82 may thus seem to be controlled by the switch 67 so that whenever switch 67 is closed the operator is energized. Energization of the operator closes the three normally open switches 88 which supply power to the means for heating the enclosure, the heating means being indicated schematically at 89.

A wire 91 is connected to terminal 77 and to one side of an electromagnetic operator 92. The other side of the operator 92 is connected by means of a wire 93 to the secondary coil of a transformer 94. The other side of the secondary coil is connected by means of a wire 96 to the terminal 78. The operator 92 may thus be seen to be controlled by the switch 73 so that when the switch 73 is closed the operator 92 is energized. Energization of operator 92 serves to close the normally open switches 97 which control the application of power to the means for cooling the enclosure, the cooling means being indicated schematically at 98.

In operation, as the temperature in the enclosure falls below the control point, the arm 22 will close against the contact 24 as shown in the drawing. This closure of the contacts 27 produces no effect on the circuit since the switch 48 is open. A further drop of temperature in the enclosure causes the lever 17 to engage the contact 29, thereby closing the set of contacts indicated at 32. This produces the energizing circuit for the relay coil 42 which may be traced from secondary coil 19, wire 21, lever 17, contacts 32, wire 41, relay coil 42, wire 43 and wire 44. Energization of the coil 42 closes the switch 67 to thereby place the heating means 89 in operation. An energizing circuit for the bulb heater 62 is also provided which may be traced from secondary coil 19, wire 21, lever 17, contacts 32, wire 41, wire 59, wire 61, heater 62, wire 63 and wire 44. Energization of heater 62 causes the actuator 34 to move the lever 17 in a clockwise direction after a short time interval, the effect of the application of anticipating or false heat to the actuator bulb serving to lower the apparent differential of the control, as is well known in the art. Energization of relay coil 42 further closes the holding switch 48 which provides a holding circuit for the relay coil through contacts 27, wire 47, switch 48 and wire 51. This holding circuit makes the energization of relay coil 42 independent of the opening of contacts 32. As the lever 17 moves clockwise as the result of the heat applied by heater 62, contacts 32 will be opened, however, this will not deenergize coil 42 because of the holding circuit through switch 48. A short time after the opening of contacts 32, the contacts 27 will be opened and this will deenergize the relay coil 42 to shut down the heating means and will also deenergize the heater 62. If the temperature of the enclosure has not reached the control point, the contacts 27 and 32 will again be closed in sequence and the heating means will again be operated for a time interval. It should be noted that the provision of the sequentially operated contacts 27 and 32 and the holding circuit for the relay coil obviate the necessity of providing snap action of the contacts, this arrangement being well known in the art.

Should the temperature of the enclosure rise above the control point, requiring operation of the cooling means 98, the motion of the actuator 34 will be such as to move the lever 17 clockwise as viewed in the drawing. This clockwise motion will initially close the contacts 28, this closure providing an energizing circuit for the heater 62 which may be traced as follows: Secondary 19, wire 21, lever 17, arm 23, contacts 28, wire 56, switch 66, wire 64, wire 61, heater 62, wire 63 and wire 44. Energization of the anticipating heater 62 applies heat to the bulb 37, tending to move the lever 17 to close the contacts 33.

As the temperature of the enclosure continues to rise, the contacts 33 will be closed. This provides an energizing circuit for the relay coil 53 which may be traced as follows: Secondary coil 19, wire 21, lever 17, contacts 33, wire 52, relay coil 53, wire 54 and wire 44. Energization of the relay coil 53 closes the switch 73 to energize the cooling means 98. Energization of relay coil 53 also closes the switch 57 which provides a holding circuit for the relay coil through contacts 28, wire 56, switch 57 and wire 58. Energization of the relay coil 53 further opens the switch 66 to break the circuit to the anticipating heater 62. The action of the circuit is thus such as to apply anticipating heat to the bulb 37 in the period between closure of contacts 28 and 33 with the anticipating heat being removed when the last-to-close set of contacts 33 are closed. As the temperature in the enclosure falls, due to operation of the cooling means, the contacts 33 will open, however, this will not deenergize the relay coil 53 since it is held in through the switch 57. Continued decrease in the enclosure temperature causes the contacts 28 to open, which deenergizes the cooling means 98. A subsequent rise in the enclosure temperature causes a repeat of the cycle just described.

It should be noted that anticipating heat is applied by means of the circuit above described in both the heating and cooling operation. It should further be noted that the same anticipating heater is utilized in both the cooling and heating operations.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A control circuit for controlling both heating and cooling means for an enclosure, said circuit comprising: a transformer having a secondary winding serving as a source of power for the control circuit, a switching mechanism movable between a first position wherein a first set of contacts are closed, a second position wherein a second set of contacts are closed, a third position wherein a third set of contacts are closed and a fourth position wherein a fourth set of contacts are closed, an actuator having a sensing element responsive to the enclosure temperature, means including said actuator for moving said switching mechanism between its said first and second positions on a predetermined increase in enclosure temperature and between its said third and fourth positions on a predetermined decrease in enclosure temperature, an electromagnetic operator adapted when energized to operate the enclosure heating means, a further electromagnetic operator adapted when energized to operate the enclosure cooling means, a first normally open holding switch moved to closed position by energization of said heating means operator, a second normally open holding switch moved to closed position by energization of said cooling means operator, an anticipating electric heater disposed adjacent said sensing element to affect the response thereof, a normally closed anticipating heater control switch moved to open position by energization of said cooling means operator, said heating means operator being connected across said transformer secondary through a circuit branch including said first set of contacts and said first holding switch and through a circuit branch including only said second set of contacts, said cooling means operator being connected across said transformer secondary through a circuit branch including said third set of contacts and said second holding switch and through a circuit branch including only said fourth set of contacts, said anticipating heater being connected across said secondary by three circuit paths, one including only said second set of contacts, another including said first set of contacts and said first holding switch, and the other including said third set of contacts and said anticipating heater control switch, whereby said anticipating heater applies false heat to said sensing element for a period measured by the time interval between the closing of said second set of contacts and the opening of said first set of contacts upon rising enclosure temperature and further applies false heat to said sensing element for a period measured by the time interval between closing of said third set of contacts and closing of said fourth set of contacts upon falling enclosure temperature.

2. A control circuit for controlling both heating and cooling means for an enclosure, said circuit comprising: a source of power for the control circuit, a switching mechanism movable between a first position wherein a first set of contacts are closed, a second position wherein a second set of contacts are closed, a third position wherein a third set of contacts are closed and a fourth position wherein a fourth set of contacts are closed, an actuator having a sensing element responsive to the enclosure temperature, means including said actuator for moving said switching mechanism between its said first and second positions on a predetermined increase in enclosure temperature and between its said third and fourth positions on a predetermined decrease in enclosure temperature, an electrically energized operator adapted when energized to operate the enclosure heating means, a further electrically energized operator adapted when energized to operate the enclosure cooling means, a first normally open holding switch moved to closed position by energization of said heating means operator, a second normally open holding switch moved to closed position by energization of said cooling means operator, an anticipating electric heater disposed adjacent said sensing element to affect the response thereof, a normally closed anticipating heater control switch moved to open position by energization of said cooling means operator, said heating means operator being connected across said source of power through a circuit branch including said first set of contacts and said first holding switch and through a circuit branch including only said second set of contacts, said cooling means operator being connected across said source of power through a circuit branch including said third set of contacts and said second holding switch and through a circuit branch including only said fourth set of contacts, said anticipating heater being connected across said source of power by three circuit paths, one including only said second set of contacts, another including said first set of contacts and said first holding switch, and the other including said third set of contacts and said anticipating heater control switch, whereby said antcipating heater applies false heat to said sensing element for a period measured by the time interval between the closing of said second set of contacts and the opening of said first set of contacts upon rising enclosure temperature and further applies false heat to said sensing element for a period measured by the time interval between closing of said third set of contacts and closing of said fourth set of contacts upon falling enclosure temperature.

References Cited in the file of this patent
UNITED STATES PATENTS

| | | |
|---|---|---|
| 2,188,877 | Kriechbaum | Jan. 30, 1940 |
| 2,403,798 | Holmes | July 9, 1946 |